United States Patent
Harrang et al.

(10) Patent No.: US 9,888,003 B2
(45) Date of Patent: Feb. 6, 2018

(54) PRE-DELIVERY OF CONTENT TO DEVICES

(71) Applicant: OPANGA NETWORKS, INC., Seattle, WA (US)

(72) Inventors: Jeffrey Paul Harrang, Sammamish, WA (US); John Burnette, Seattle, WA (US); David Gibbons, Redmond, WA (US)

(73) Assignee: OPANGA NETWORKS, INC., Seattle, WA (US)

( * ) Notice: Subject to any disclaimer, the term of this patent is extended or adjusted under 35 U.S.C. 154(b) by 305 days.

(21) Appl. No.: 14/212,934

(22) Filed: Mar. 14, 2014

(65) Prior Publication Data

US 2014/0280996 A1  Sep. 18, 2014

Related U.S. Application Data

(60) Provisional application No. 61/800,464, filed on Mar. 15, 2013.

(51) Int. Cl.
| | |
|---|---|
| H04L 29/06 | (2006.01) |
| H04L 29/08 | (2006.01) |
| H04N 21/25 | (2011.01) |
| H04N 21/258 | (2011.01) |
| H04N 21/262 | (2011.01) |
| H04N 21/433 | (2011.01) |
| H04N 21/488 | (2011.01) |
| H04N 21/6543 | (2011.01) |

(52) U.S. Cl.
CPC ......... *H04L 63/10* (2013.01); *H04L 65/4084* (2013.01); *H04L 67/2842* (2013.01); *H04N 21/252* (2013.01); *H04N 21/25891* (2013.01); *H04N 21/262* (2013.01); *H04N 21/4331* (2013.01); *H04N 21/4882* (2013.01); *H04N 21/6543* (2013.01)

(58) Field of Classification Search
CPC combination set(s) only.
See application file for complete search history.

(56) References Cited

U.S. PATENT DOCUMENTS

| | | | |
|---|---|---|---|
| 9,239,862 B2 * | 1/2016 | Mizrotsky | ......... G06F 17/30424 |
| 2003/0206520 A1 * | 11/2003 | Wu | .......................... H04L 12/18 370/230 |
| 2004/0073867 A1 | 4/2004 | Kausik et al. | |

(Continued)

FOREIGN PATENT DOCUMENTS

KR  10-2013-0022942 A  3/2013

OTHER PUBLICATIONS

International Search Report and Written Opinion for PCT/US2014/028703, filed Mar. 14, 2014.

*Primary Examiner* — Chris Parry
*Assistant Examiner* — Caroline Jahnige

(57) ABSTRACT

Systems and methods for pre-delivering content to user devices are described. In some embodiments, the systems and methods may assign a user device to a group of user devices that receive content from a common network edge cache, identify one or more differences between content delivered to the user device and content delivered to the group of user devices via the common network edge cache, select a piece of content to deliver to the user device based on the identified one or more differences of content, and cause delivery of the selected piece of content to the user device.

22 Claims, 9 Drawing Sheets

(56) References Cited

U.S. PATENT DOCUMENTS

| | | | |
|---|---|---|---|
| 2007/0118847 A1* | 5/2007 | Sugimoto | G06F 17/30867 |
| | | | 725/1 |
| 2008/0242280 A1 | 10/2008 | Shapiro et al. | |
| 2009/0106393 A1* | 4/2009 | Parr | H04L 63/0428 |
| | | | 709/218 |
| 2009/0248785 A1* | 10/2009 | Gemelos | G06Q 30/0283 |
| | | | 709/201 |
| 2009/0248858 A1 | 10/2009 | Sivasubramanian et al. | |
| 2009/0292819 A1* | 11/2009 | Kandekar | H04N 7/17318 |
| | | | 709/231 |
| 2010/0109868 A1* | 5/2010 | Berger | G06F 3/04847 |
| | | | 340/540 |
| 2010/0205216 A1* | 8/2010 | Durdik | G06F 17/30522 |
| | | | 707/783 |
| 2011/0252100 A1 | 10/2011 | Raciborski et al. | |
| 2013/0080526 A1* | 3/2013 | Gill | G06Q 10/10 |
| | | | 709/204 |
| 2013/0136425 A1* | 5/2013 | Herby | H04N 5/76 |
| | | | 386/296 |
| 2013/0185382 A1* | 7/2013 | Hardy | H04L 65/4076 |
| | | | 709/217 |
| 2014/0082212 A1* | 3/2014 | Garg | H04N 21/23439 |
| | | | 709/233 |

* cited by examiner

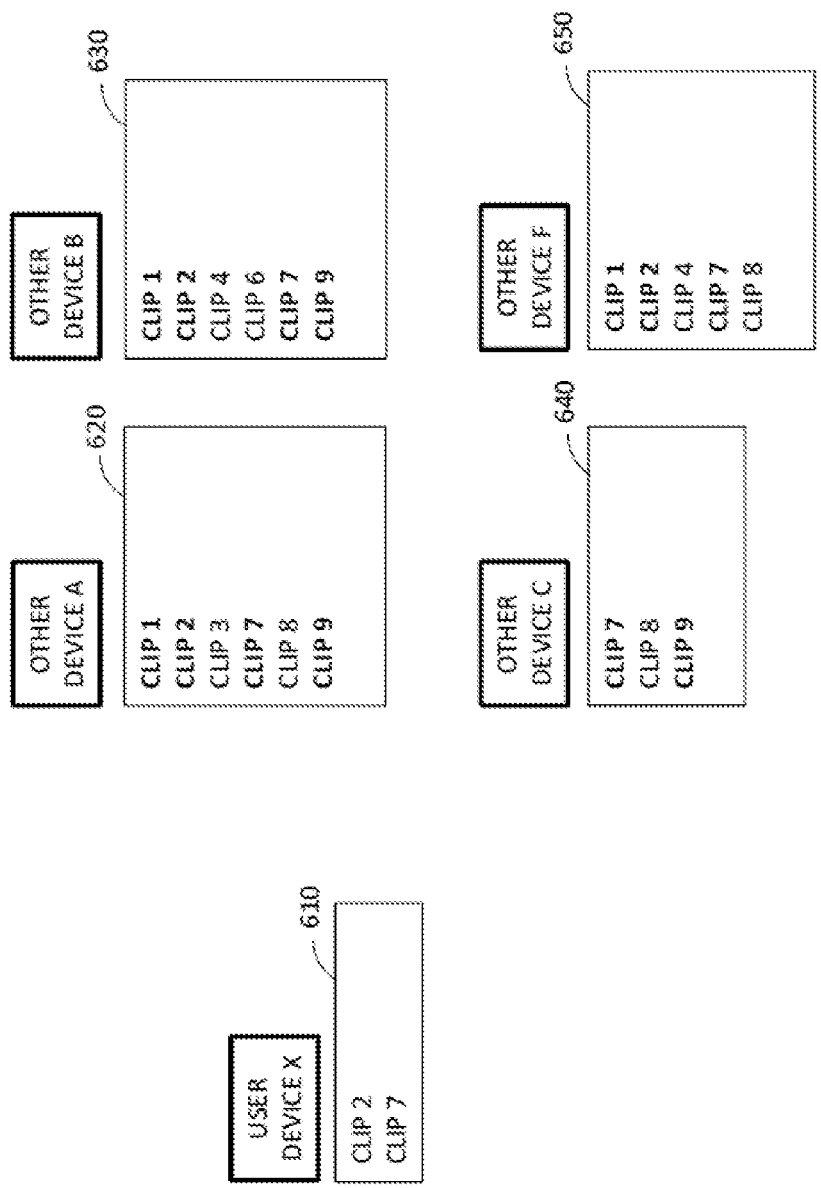

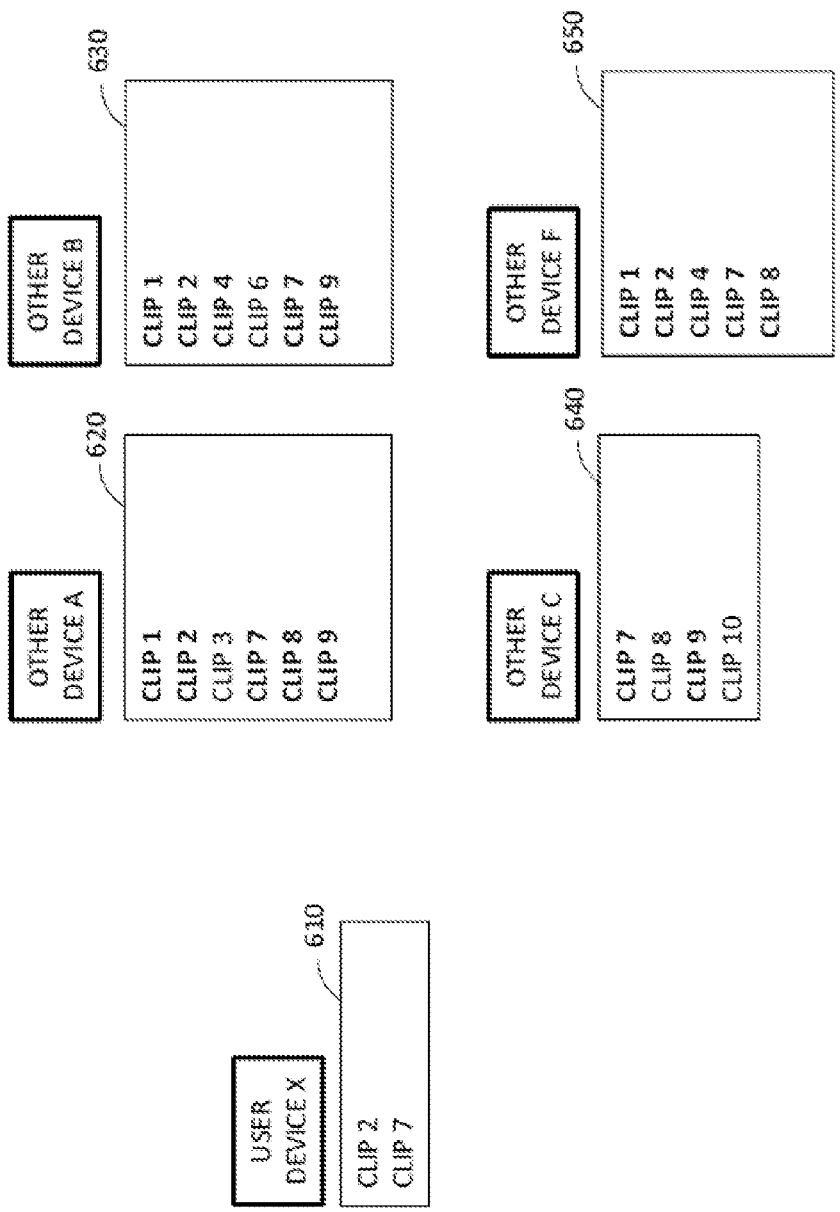

PRE-DELIVERY OF CONTENT TO DEVICES

CROSS-REFERENCES TO RELATED APPLICATIONS

This application claims priority to U.S. Provisional Application No. 61/800,464, filed on Mar. 15, 2013 entitled SYSTEM AND METHOD TO SELECT CONTENT FOR PRE-DELIVERY, which is hereby incorporated by reference in its entirety.

BACKGROUND

Media and other content is often delivered to requesting devices (e.g., mobile or other user devices) over a network via or from network edge caches. Typically, a content provider or other network component utilizes cache controllers and associated algorithms to determine the content delivered to user devices that should be cached, such as content that is predicted to be popular, viral, and/or often requested by user devices. Therefore, when a user device requests delivery of a popular piece of content, the content provider, via the network edge cache, is able to quickly respond and deliver the requested content to the user device from the network edge cache that is proximate to the requesting user device.

BRIEF DESCRIPTION OF THE DRAWINGS

FIGS. 6A-6D are block diagrams illustrating the selection of content to pre-deliver to a user device.

SUMMARY

Figure 1:
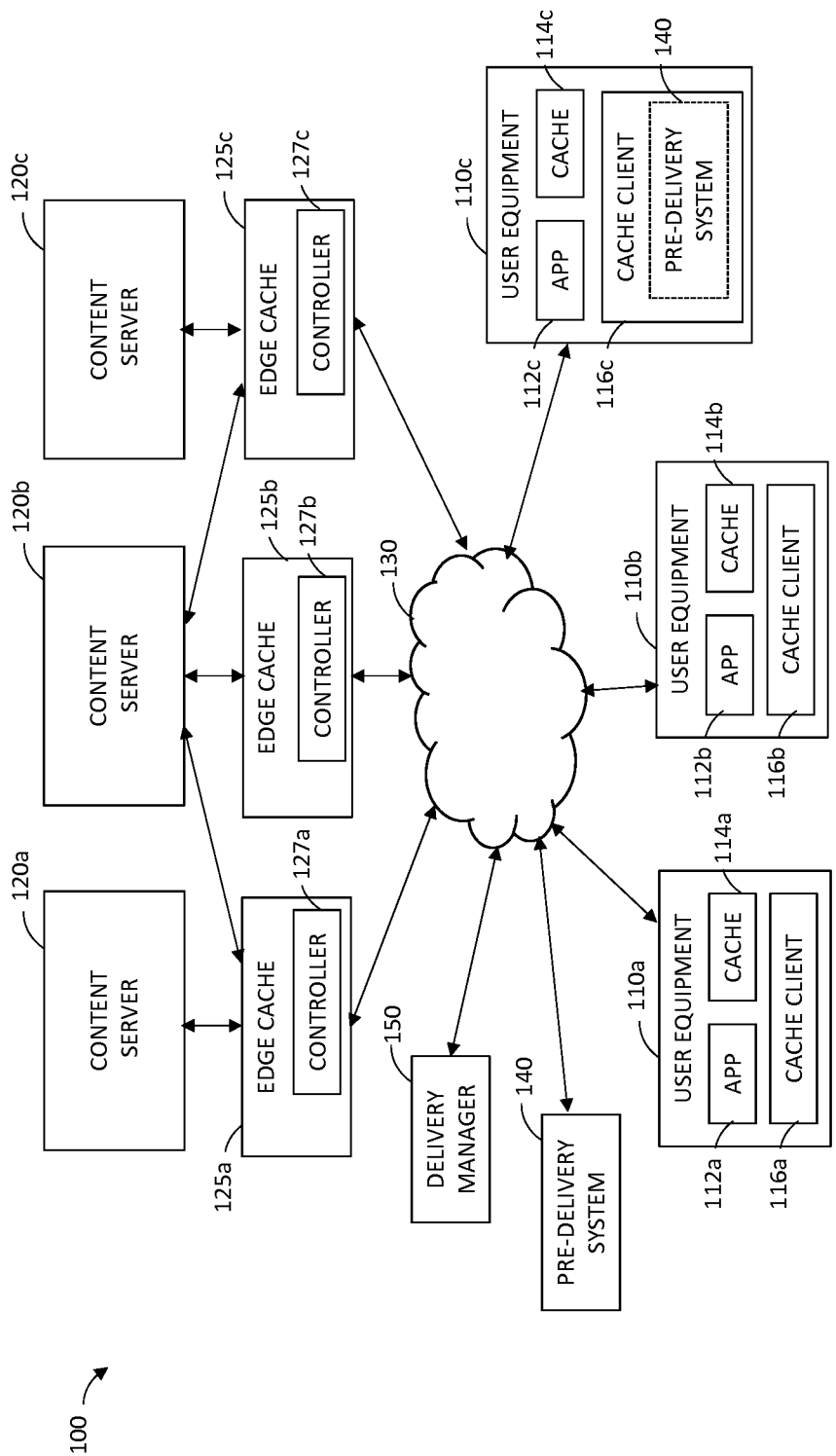
FIG. 1 is a block diagram illustrating a suitable computing environment.

In some embodiments, a method includes assigning a user device to a group of user devices that receive content from a common network edge cache, identifying one or more differences between content delivered to the user device and content delivered to the group of user devices via the common network edge cache, selecting a piece of content to deliver to the user device based on the identified one or more differences of content, and causing delivery of the selected piece of content to the user device.

In some embodiments, a system includes a device assignment module that assigns a user device to a group of user devices that receive content from a common network edge cache, a content difference module that identifies one or more differences between content delivered to the user device and content delivered to the group of user devices via the common network edge cache, a content selection module that selects a piece of content to deliver to the user device based on the identified one or more differences of content, and a content delivery module that causes delivery of the selected piece of content to the user device.

In some embodiments, a method includes pre-delivering content to a user device from a network edge cache by assigning the user device to a group of other user devices associated with the network edge cache based on a match of content preferences for a user associated with the user device to content preferences for users associated with the group of other user devices, identifying content viewed by a threshold number of user devices within the identified group of user devices but not viewed by the user device, and delivering the identified content to a local cache of the user device.

DETAILED DESCRIPTION

Systems and methods for pre-delivering content to user devices are described. In some embodiments, the systems and methods may assign a user device to a group of user devices that receive content from a common network edge cache, identify one or more differences between content delivered to the user device and content delivered to the group of user devices via the common network edge cache, select a piece of content to deliver to the user device based on the identified one or more differences of content, and cause delivery of the selected piece of content to the user device.

For example, the systems and methods may pre-deliver content to a user device from a network edge cache by assigning the user device to a group of other user devices associated with the network edge cache based on a match of content preferences for a user associated with the user device to content preferences for users associated with the group of other user devices, identifying content viewed by a threshold number of user devices within the identified group of user devices but not viewed by the user device, and delivering the identified content to a local cache of the user device.

Thus, in some embodiments, the systems and methods enable the pre-delivery of content to a user device based on a determination or prediction that a user of the user device is likely to later request the content. Such a determination may be based on determining content request patterns across multiple content providers or sources, without requiring the content providers to maintain or publish information about content requests and/or deliveries, among other things. Therefore, pre-delivering content to user devices that is determined to be requested by users enables a content provider to immediately and successfully provide content to users, among other benefits.

For example, the systems and methods described herein may pre-deliver a new video from the music artist Macklemore to a user device associated with a 13 year old girl located in Seattle, Wash. upon (1) determining that other girls ages 10-15 also located in Seattle, Wash. have received the new Macklemore video from a network edge cache that also delivers content to the user device of the 13 year old girl, and (2) determining that the 13 year old girl has not yet viewed the new Macklemore video.

In the following detailed description, reference is made to the accompanying drawings, which form a part of the description. The embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The technology can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term processor refers to one or more devices, circuits, and/or processing cores configured to process data, such as computer program instructions.

A detailed description of embodiments is provided below along with accompanying figures that illustrate the principles of the technology. The technology is described in connection with such embodiments, but the technology should not be limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of illustration and the technology may be practiced according to the claims without some or all of these specific details. For the purpose of clarity, technical material that is known in the technical fields related to the technology has not been described in detail so that the technology is not unnecessarily obscured.

Examples of the Network Environment

FIG. 1 is a block diagram illustrating a suitable network environment 100. The network environment 100 includes one or more user equipment or devices 110a-c, one or more content servers 120a-c, and one or more network edge caches 125a-c that communicate with one another over a data communication network 130.

Any of the machines, databases, or devices shown in FIG. 1 may be implemented in a general-purpose computer modified (e.g., configured or programmed) by software to be a special-purpose computer to perform the functions described herein for that machine, database, or device. Moreover, any two or more of the machines, databases, or devices illustrated in FIG. 1 may be combined into a single machine, and the functions described herein for any single machine, database, or device may be subdivided among multiple machines, databases, or devices.

The content servers 120a-c may provide a variety of different media and other content types, such as video content (e.g., movies, television shows, news programming, video clips), image content (e.g., image or picture slideshows), audio content (e.g., radio programming, music, podcasts), and so on. The content servers 120a-c may deliver, transfer, transport, and/or otherwise provide media files and other content to the network edge caches 125a-c, which may deliver, transfer, transport, and/or otherwise provide the content to requesting devices (e.g., user equipment 110a-c) via various media transfer protocols (e.g., Hypertext Transfer Protocol (HTTP), File Transfer Protocol (FTP), HTTP Live Streaming (HLS), HTTP Dynamic Streaming (HDS), HTTP Smooth Streaming (HSS), Dynamic Adaptive Streaming over HTTP (DASH), Real Time Streaming Protocol (RTSP), and so on).

The network edge caches 125a-c may be located at the borders or edges of various access network domains (e.g., a core network border of a mobile carrier), in order to be proximate to requesting user device. There may be a hierarchy of various different cache locations (e.g., caches that deliver content to a metro region, caches that deliver content to a state or other large regions, caches that deliver content to a nation, and so on). Therefore, a network edge cache may be, in some embodiments, a single caching server and controller that serves a single geographical location and associated user devices, or, in other embodiments, multiple caching servers and controllers that serve various different geographical locations and associated user devices.

For example, a common or shared network edge cache, as described herein, may be a group of federated edge caches, such as a group of edge caches operated by a content delivery node or network or one or more service providers. The group of edge caches may work together to supply content that is proximate to users being served by the edge caches. The edge caches may distribute operations across the individual caches to provide load sharing or fault tolerance mechanisms, to quickly and efficiently transfer content to requesting devices. Therefore, a common or shared network edge cache may be a single physical edge cache server (e.g., edge cache 125a) and/or a group of federated edge cache servers (e.g., edge caches 125a-c).

The network edge caches 125a-c include network edge cache controllers 127a-c, which communicate with the user equipment 110a-c and maintain lists of content delivered from the network edge caches 125a-c to the user equipment 110a-c. The user equipment 110a-c may register with the controllers 127a-c on a periodic basis (e.g., once an hour) or after an occurrence of an event (e.g., an IP address change).

As shown in FIG. 1, in some embodiments, a variety of different content providers (e.g., competing or separate providers) may utilize the content servers 120a-c to deliver content to user equipment 110a-c. In such embodiments, one or more of the network edge cache controller 127a-c may act as a centralized controller, capable of maintaining client lists associated with the delivery of content from multiple network edge cache 125a-c to user equipment 110a-c.

The network 130 may be any network that enables communication between or among machines, databases, and devices. Accordingly, the network 130 may be a wide access network (WAN), wired network, a fiber network, a wireless network (e.g., a mobile or cellular network), a cellular or telecommunications network (e.g., WiFi, Global System for Mobile Communications (GSM), Universal Mobile Telecommunications System (UMTS), Long Term Evolution (LTE) network), or any suitable combination thereof. The network 130 may include one or more portions of a private network, a public network (e.g., the Internet), or any suitable combination thereof.

The user equipment 110a-c may include various types of user devices, such as mobile devices (e.g., laptops, smart phones, tablet computers, and so on), computing devices, set-top boxes, vehicle computing devices, gaming devices, and so on. The user equipment 110a-c may support and run various different operating systems, such as Microsoft® Windows®, Mac OS®, Google® Chrome®, Linux®, Unix®, or any other mobile operating system, including Symbian®, Palm®, Windows Mobile®, Google® Android®, Mobile Linux®, and so on.

The user equipment 110a-c may also support various components configured to request, receive, display, and/or present content to users associated with the user equipment 110a-c. For example, the user equipment 110a-c may include applications 112a-c, such as an app, browser, or other component that sends request for content to content servers 120a-c and presents received content to the users via various display or presentation components. The user equipment 110a-c may also include caches 114a-c, such as a local cache or data store that stores received content (e.g., pre-delivered content) and provides the stored content to the requesting applications 112a-c, as well as cache clients 116a-c, such as a local client that controls and monitors the reception and provision of content in and out of a cache, among other functions. A local cache may be, for example, a storage or memory component contained by the user equipment 110a-c, a detachable storage component that may be attached to the user equipment 110a-c, a storage device associated with a local access network (LAN) that includes the user equipment 110a-c, and/or other storage locations or devices that store media, files, and other data for the user equipment 110a-c (e.g., a storage location or device that provides storage and is accessible only by a certain or associated user equipment 110a).

In some embodiments, the network environment 100 includes a pre-delivery system 140, which identifies, selects, and/or pre-delivers content to user devices from network edge caches 125a-c. The pre-delivery of content to user devices may refer to the partial or complete delivery of content associated with a media or data file that occurs before a user has made an explicit request to consume the media file.

For example, the pre-delivery system 140, which may be part of the cache clients 116a-c (see, e.g., cache client 116c) may utilize cached content lists generated by the controllers 127a-c and maintained by the network edge caches 125a-c in order to determine and/or identify the content request patterns for other user devices that are similar to a certain user device (e.g., other user devices having users that are "friends" with the user of the certain user device or otherwise share similar demographic characteristics).

The pre-delivery system 140 may select and cause pre-delivery of the content to the user device based on the determined content request patterns (e.g., patterns that identify content delivered to and/or viewed by multiple other user devices that has not yet been delivered to and/or viewed by the certain user device), based on the processes and methods described in more detail herein. Therefore, the pre-delivery system 140 may provide a user device with immediate and reliable access to popular content provided over a mobile network by anticipating future content requests from the user device, because the system 140 identifies the viewing trends of similar user devices from content delivered to the user devices from a common or shared network edge cache.

In some embodiments, the network edge cache controllers may include some or all components of the pre-delivery system 140. For example, the network edge cache controller 127c may determine content predicted to be of interest for a user device 110a, based on monitoring the request history of the user equipment 110a-c. In such a configuration, the cache client 114a may periodically request or be pushed (e.g., via RSS syndication) a content list of interesting content from the controller 127c, which provides the list of available content to the user device 110a.

The network environment 100 also includes a delivery manager 150, which directs or otherwise manages the delivery of content between devices, such as from the content servers 120a-c to the network edge caches 125a-c to the user equipment 110a-c, from the user equipment 110a-c to the content servers 120a-c, between user equipment (e.g., from user equipment 110a to user equipment 110c), between content servers (e.g., from content server 120b to content server 120c, and so on. The delivery manager 150 may, when instructed, track, store, and/or provide information associated with various network delivery policies and/or protocols utilized during the delivery of content over the network 130. Although the delivery manager 150 is depicted as being separate from the content servers 120a-c, any of the content servers 120a-c may include some or all components of the delivery manager 150.

In some embodiments, the delivery manager 150 directs or manages the delivery of content via a delivery policy that utilizes or uses surplus network bandwidth or surplus network capacity. A surplus of network bandwidth or network capacity may be network bandwidth or network capacity that is determined to be available (e.g., idle or free) in a network in view of the total capacity of the network and/or and the total usage of the network. In some embodiments, a network provider determines the amount of surplus network capacity available in a network in view of the total capacity of the network and/or and the total usage of the network. The surplus network capacity may be determined statically or dynamically, and, therefore, a determined surplus network capacity for a network may vary substantially and/or randomly over time (e.g., during peak use periods), for long or short time scales, and/or between one service provider to another.

For example, a network provider may set a threshold at a predetermined percentage of the total capacity of a network (e.g., 50%, 60%, 80%, 90%, 98%, and so on) of the total capacity). The surplus capacity, therefore, is the free bandwidth or capacity between an actual and/or current usage, and the predetermined percentage of the total capacity. For example, if the current usage of a network provider's capacity is 66%, and the predetermined percentage is 85%, the surplus network capacity is 19% of the bandwidth provided by that access provider (surplus capacity or bandwidth may be expressed in a variety of ways, such as a percentage of the total network capacity, as an absolute magnitude, or as any other suitable metrics).

Therefore, the delivery manager 150 may direct or manage the delivery of content between content providers 120a-c, network edge caches 125a-c, and user equipment 110a-c over various selected delivery policies or protocols that utilize free, available, idle, or otherwise surplus bandwidths or capacities of networks, such as paths or protocols that deliver data over currently underused networks that would not otherwise be in use, and/or without substantially impacting or altering the transport performance associated with other data traffic sharing the network.

Further details regarding the delivery of content using surplus network capacity may be found in commonly-assigned U.S. Pat. No. 7,500,010, issued on Mar. 3, 2009, entitled ADAPTIVE FILE DELIVERY SYSTEM AND METHOD, U.S. Pat. No. 8,589,585, issued on Nov. 19, 2013, entitled ADAPTIVE FILE DELIVERY SYSTEM AND METHOD, and U.S. Published Patent Application No. 2010/0198943, filed on Apr. 15, 2010, entitled SYSTEM AND METHOD FOR PROGRESSIVE DOWNLOAD USING SURPLUS NETWORK CAPACITY, all of which are hereby incorporated by reference in their entirety.

In some embodiments, the pre-delivery system 140 may utilize other network devices and/or components in order to identify and/or pre-deliver content to user devices. For example, the pre-delivery system 140 may communicate with devices capable of inspecting and identifying requests from groups of user devices, such as servers monitoring traffic at a domain edge of an access network by performing deep pack inspection, in order to collect and maintain file request information from groups of user devices that were served by the access network.

As another example, the pre-delivery system 140 may utilize information provided by the delivery manager 150 or other central content delivery management components, such as information identifying a correlation of viewing history between user equipment 110*a-c*, and identify content to be pre-delivered based on the correlations.

Examples of Pre-Delivering Content to User Devices

Figure 2:
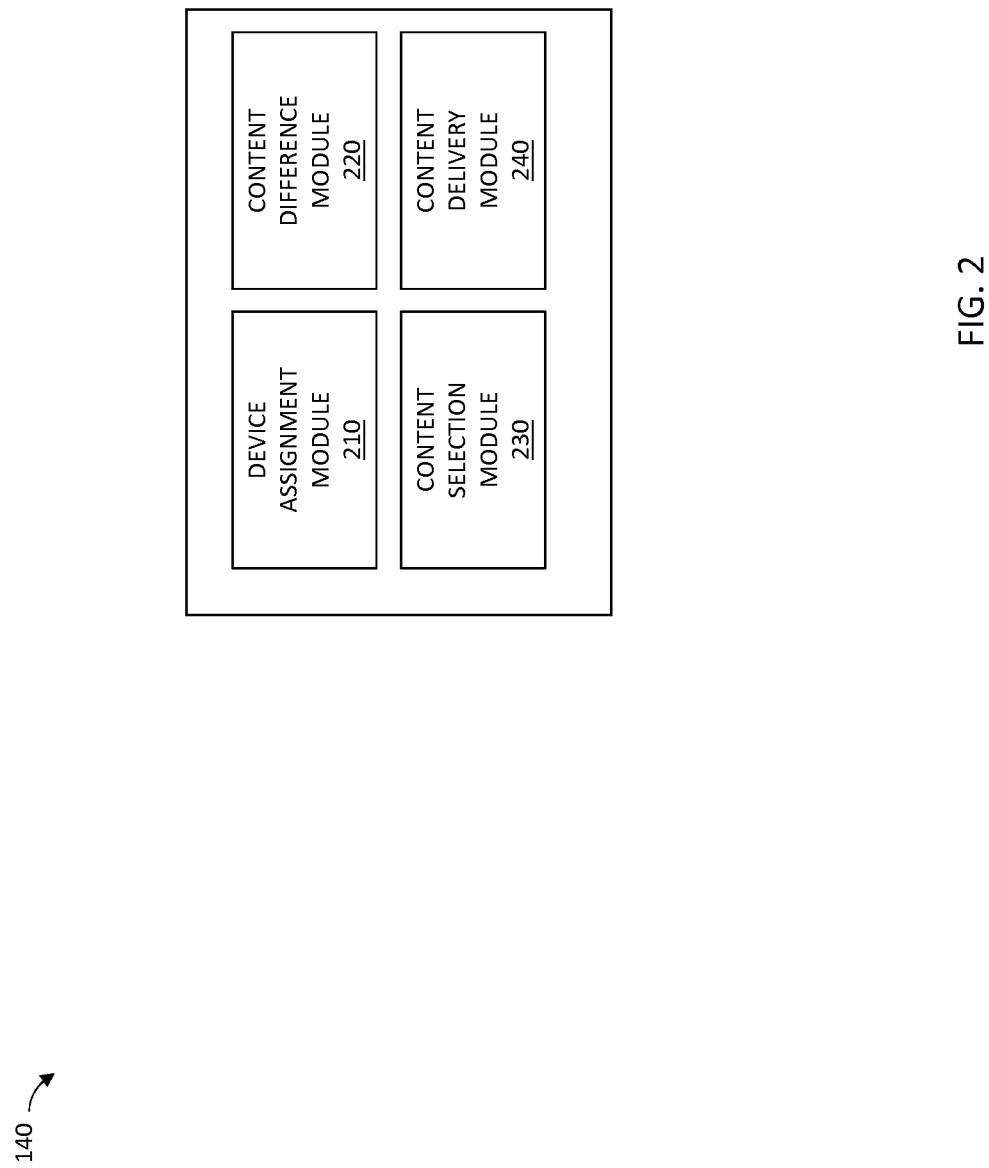
FIG. 2 is a block diagram illustrating components of a pre-delivery system.

As described herein, in some embodiments, the pre-delivery system 140 causes the delivery of content to a user device based on a likelihood that the user device will later request the content. FIG. 2 is a block diagram illustrating components of the pre-delivery system 140.

The pre-delivery system 140 may include one or more modules and/or components to perform one or more operations of the pre-delivery system 140. The modules may be hardware, software, or a combination of hardware and software, and may be executed by one or more processors. For example, the pre-delivery system 140 may include a device assignment module 210, a content difference module 220, a content selection module 230, and a content delivery module 240.

In some embodiments, the device assignment module 210 is configured and/or programmed to assign a user device to a group of user devices that receive content from a common network edge cache. For example, the device assignment module 210 assigns the user device to a group of user devices that each received a similar piece of content (or, similar pieces of content) from the common network edge cache and/or based on a match of user demographic information associated with a user of the user device to user demographic information associated with users of the group of user devices.

Similar content may include any content that shares common characteristics, such as content having similar titles, file names, URLs, and so on, content having similar associated description information or other metadata, content having similar actual content segments (e.g., matching video frames or audio profiles), and so on. For example, a first video clip that contains content presenting a certain snowboard trick and is titled "frontside air halfpipe" may be similar to a second video clip that presents the exact same content and is entitled "X Games best trick," even though the titles of the clips are different.

In some embodiments, the content difference module 220 is configured and/or programmed to identify one or more differences between content delivered to the user device and content delivered to the group of user devices via the common network edge cache. For example, the content difference module 220 selects one or more pieces of content that have been delivered to the group of user devices (e.g., such as a threshold number of user devices within the group of user devices) but not yet delivered to the user device.

In some embodiments, the content selection module 230 is configured and/or programmed to select a piece of content to deliver to the user device based on the identified one or more differences of content. For example, the content selection module 230 selects one or more pieces of content that have been delivered to a threshold number of user devices within the group of user devices, but not yet delivered to the user device.

The content selection module 230 may consider other factors or information when selecting pieces of content to deliver to the user device. For example, the content selection module 230 may only select content that is playable or otherwise appropriate for types of applications that are installed by the user device and/or the playback capabilities of the user device. As another example, the content selection module 330 may consider viewing preferences, such as preferences associated with content service plans (e.g., service provider data plans, such as unlimited plans, capped plans, WiFi only plans, data usage patterns or statistics, and so on), preferences associated with security or the age of a user (e.g., only kid friendly or age-appropriate content, content from whitelisted providers, and so on), and other preferences.

In some embodiments, the content delivery module 240 is configured and/or programmed to cause delivery of the selected piece of content to the user device. For example, the content delivery module 240 causes pre-delivery of a selected piece of content to the user device.

In some embodiments, the content delivery module 240 presents a notification to the user of the user device when the selected piece of content has been delivered to the user device. For example, the content delivery module may cause a message, content list, or icon to be displayed that identifies the pre-delivered content and/or identifies the friends of the user that have already viewed and/or consumed the content, which may encourage the user to view otherwise consume the pre-delivered content. In other embodiments, the content delivery module 240 may cache received or pre-delivered content in a local cache 114*a-c* without explicitly notifying a user of the user device.

Figure 3:
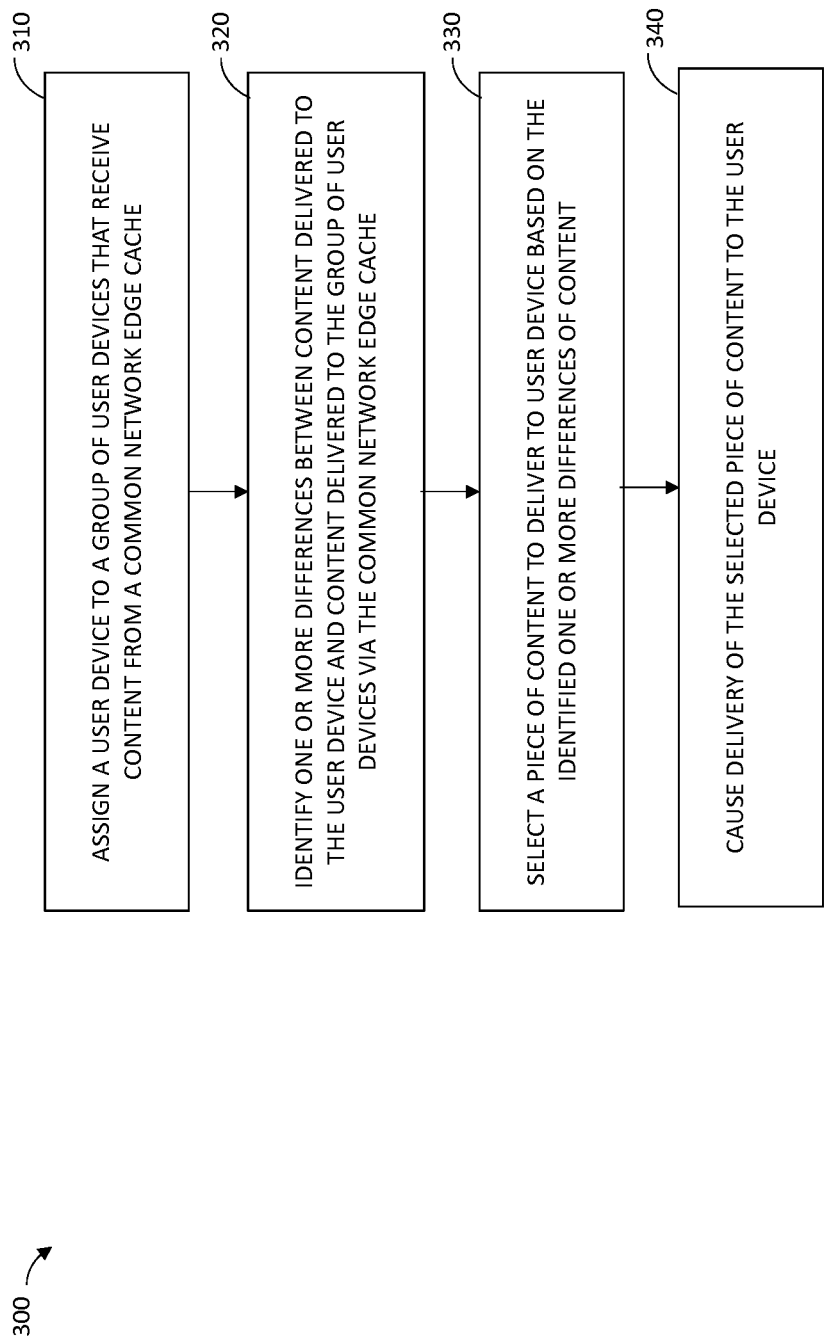
FIG. 3 is a flow diagram illustrating a method for pre-delivering content to a user device.

As described herein, the pre-delivery system 140 may perform various different methods, processes, and/or algorithms when identifying and/or pre-delivering content to a user device. FIG. 3 is a flow diagram illustrating a method 300 for pre-delivering content to the user device. The method 300 may be performed by the pre-delivery system 140 and, accordingly, is described herein merely by way of reference thereto. It will be appreciated that the method 300 may be performed on any suitable hardware.

In operation 310, the pre-delivery system 140 assigns a user device to a group of user devices that receive content from a common network edge cache. For example, the device assignment module 210 assigns the user device to a group of user devices that each received a similar piece of content (or, similar pieces of content) from the common network edge cache and/or based on a match of user demographic information associated with a user of the user device to user demographic information associated with users of the group of user devices.

In some embodiments, the device assignment module 210 may assign the user device to a group of user devices that all share or have received content from a common network edge cache (e.g., edge cache 125*a*) based on a variety of different matching characteristics, including user demographic information or characteristics (e.g., age, sex, interests, education, experience, place of employment, and so on), geographic location information or characteristics (e.g., current location, previous locations, heritage or family history, location of schools attended, location of previous or current employers, and so on), current or historical context information or characteristics (e.g., recent viewing, current viewing, browsing history, recent interests or online activities, current attendance at an event or conference, and so on), social network information or characteristics (e.g., a group of user devices having users that are friends within a social network with a user of the user device), and/or other shared characteristics.

In operation 320, the pre-delivery system 140 identifies one or more differences between content delivered to the user device and content delivered to the group of user devices via the common network edge cache. For example, the content difference module 220 selects one or more pieces of content that have been delivered to the group of user devices, but not yet delivered to the user device.

In some embodiments, the content difference module 220 may access a client list associated with content delivered by the common network edge cache to the group of user devices (such as a client list stored at the network edge caches 125*a-c* and generated by the controllers 127*a-c*), the client list including information identifying user devices that have requested content via the common network edge cache and information identifying the requested content, and identify the content requested by the user devices that was not requested by the user device.

In some embodiments, the content difference module 220 may perform deep packet inspection of data delivered from the common network edge cache to the user device and user devices within the group of user devices, and identify the content requested by the user devices that was not requested by the user device.

In operation 330, the pre-delivery system 140 selects a piece of content to deliver to the user device based on the identified one or more differences of content. For example, the content selection module 230 selects one or more pieces of content that have been delivered to a threshold number of user devices within the group of user devices, but not yet delivered to the user device.

Figure 4:
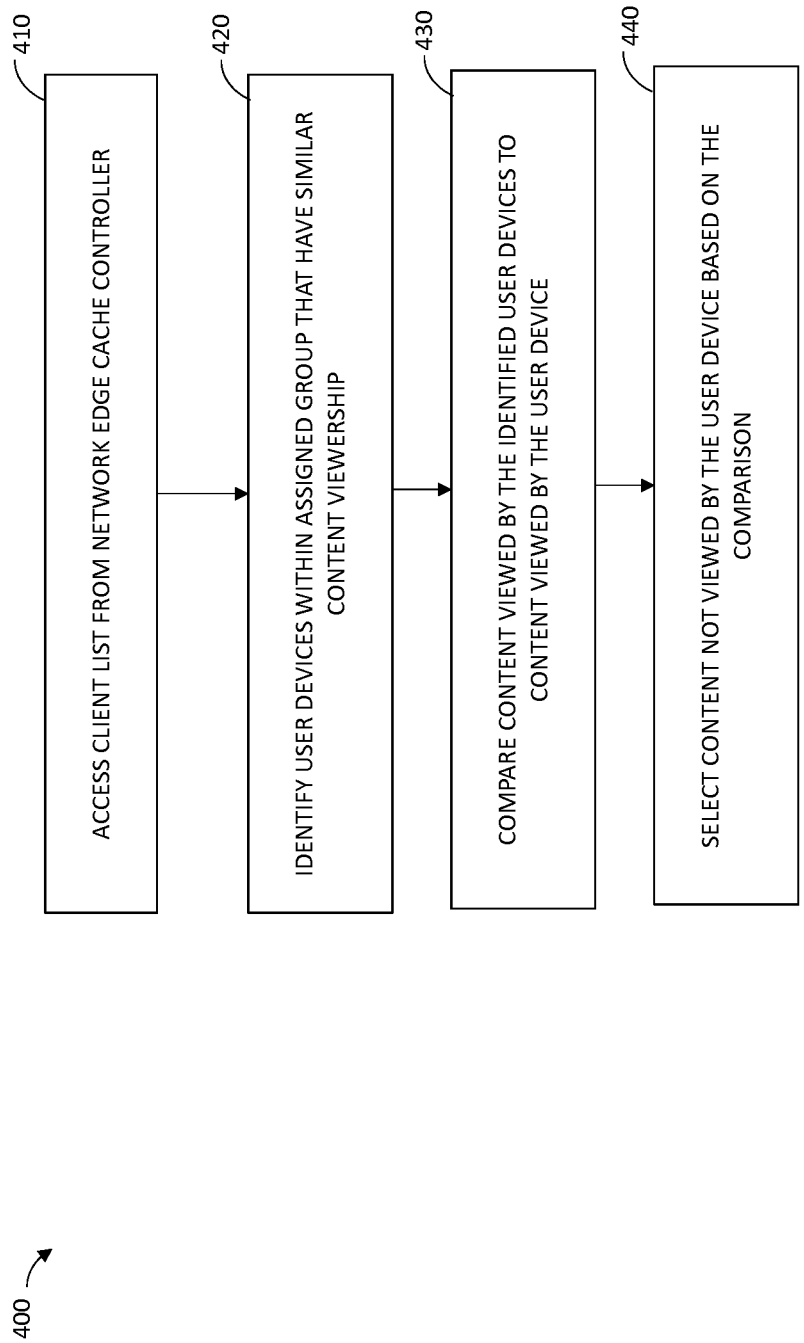
FIG. 4 is a flow diagram illustrating a method for selecting content to pre-deliver to a user device.

For example, FIG. 4 illustrates a method 400 for selecting content to pre-deliver to a user device. The method 400 may be performed by the content selection module 330 and, accordingly, is described herein merely by way of reference thereto. It will be appreciated that the method 400 may be performed on any suitable hardware.

In operation 410, the content selection module 230 accesses a client list or other data structure from the network edge cache controller 127*a-c*. The accessed client list may include various different information associated with the delivery of content from the network edge cache 125*a-c* to user devices 110*a-c*. For example, the client list may include device or unique client ID credentials (e.g., obfuscated IDs) as well as identification information for content requested by the user devices and related to the client ID credentials. An example client list is shown as follows:

| Client List for Common Network Edge Cache | |
|---|---|
| Client ID | Delivered Content |
| Device1 | videoA, videoB, videoC, audioA, podcastA, podcastB |
| Device2 | videoA, videoB, audioA, audioB, podcastA, podcastB |
| Device3 | videoA, videoC, audioB, podcastB |
| Device4 | videoE, videoF, audioD |
| User Device | podcastB, podcastC, podcastF |

In operation 420, the content selection module 230 identifies user devices within an assigned group of user devices (e.g., devices associated with users in the same age demographic) that have similar content viewership. For example, the content selection module 230 identifies Device1, Device2, and Device3 as having similar content viewership (e.g., they all share videoA and podcastB).

In operation 430, the content selection module 230 compares the content viewed by the identified user devices to content viewed by the user device, and in operation 440, the content selection module 230 selects the content not viewed by the user device, but shared by the group of devices, based on the comparison. For example, based on the comparison of the client list, the user device has consumed podcastB but has not yet viewed videoA, and the content selection module 230 selects the videoA piece of content for pre-delivery to the user device.

Referring back to FIG. 3, in operation 340, the pre-delivery system 140 causes delivery of the selected piece of content to the user device. For example, the content delivery module 240 causes pre-delivery of a selected piece of content to the user device by causing the common network edge cache to deliver the selected piece of content to a local cache of the user device.

In some embodiments, the content delivery module 240 presents a notification to the user of the user device when the selected piece of content has been delivered to the user device. For example, the content delivery module may cause a message to be displayed that identifies the pre-delivered content and/or identifies the friends of the user that have already viewed and/or consumed the content, which may encourage the user to view otherwise consume the pre-delivered content.

Figure 5:
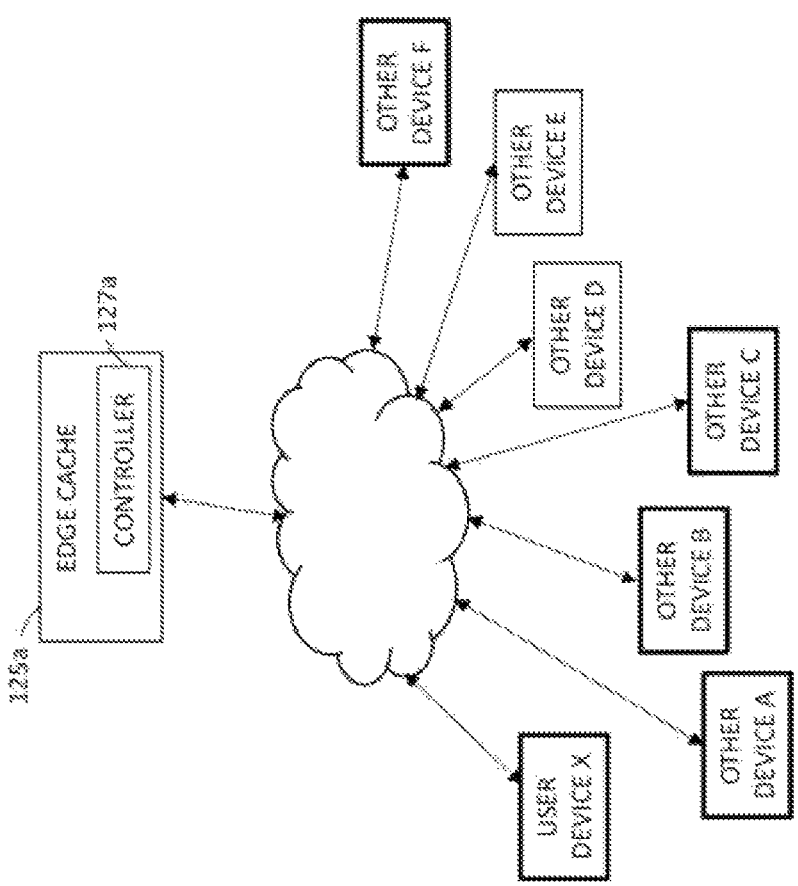
FIG. 5 is a block diagram illustrating a group of user devices that receive content from a network edge cache.

Thus, in some embodiments, the pre-delivery system 140 assigns a user device to a group of other user devices associated with a shared network edge cache based on a match of content preferences for a user associated with the user device to content preferences for users associated with the group of other user devices. For example, FIG. 5 depicts a user device X assigned to a group of user devices that receive content from a common or shared network edge cache. As depicted by FIG. 5, the user device X and other devices A-F receive, or have received, content from shared network edge cache 125*a*. However, the user device X is only grouped with other device A, other device B, other device C, and other device F, based on shared characteristics (shown in bold in FIG. 5), such as the various characteristics described herein.

Once the user device X is assigned to the group of other user devices (user devices A-C and F) associated with the shared network edge cache 125*a*, the pre-delivery system 140 identifies content viewed by a threshold number of user devices within the identified group of user devices but not viewed by the user device, and delivers the identified content to a local cache of the user device. FIGS. 6A-6D depict the selection of content to pre-deliver to a user device.

Figure 6B:
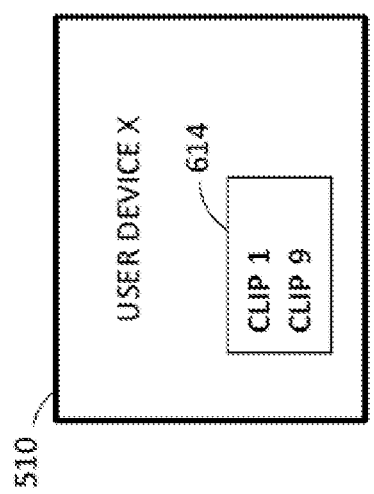

For example, FIGS. 6A-6B depict the selection of content viewed by a threshold number of at least three of the four other devices A-C and F that are grouped with the user device X 510. As shown in FIG. 6A, the other device A has a list of content 620 that includes CLIP 1, CLIP 2, CLIP 3, CLIP 7, CLIP 8, and CLIP 9, the other device B has a list of content 630 that includes CLIP 1, CLIP 2, CLIP 4, CLIP 6, CLIP 7, and CLIP 9, the other device C has a list of content 640 that includes CLIP 7, CLIP 8, and CLIP 9, and the other device F has a list of content 650 that includes CLIP 1, CLIP 2, CLIP 4, CLIP 7, and CLIP 8. As shown in bold in FIG. 6A, CLIP 1, CLIP 2, CLIP 7 and CLIP 9 are shared by at least three of the other devices A-C and F. Comparing the shared content with the list of content 610 for the user device X 510, both CLIP 1 and CLIP 9 are added to the list of content 614, as depicted in FIG. 6B, and pre-delivered to the user device X.

Figure 6D:
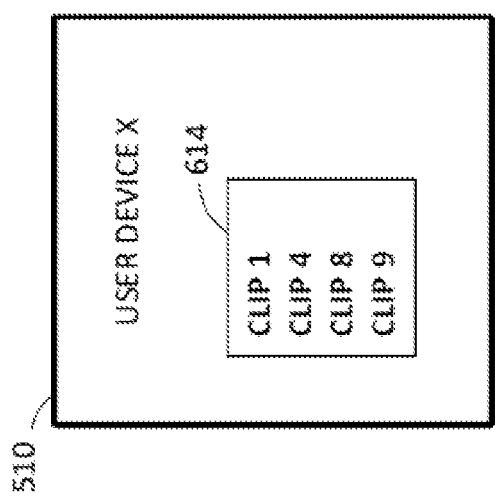

As another example, FIGS. 6C-6D depict the selection of content viewed by a threshold number of at least two of the four other devices A-C and F that are grouped with the user device X 510. As shown in bold in FIG. 6C, CLIP 1, CLIP 2, CLIP 4, CLIP 7, CLIP 8, and CLIP 9 are shared by at least two of the other devices A-C and F. Comparing the shared content with the list of content 610 for the user device X, CLIP 1, CLIP 4, CLIP 8, and CLIP 9 are added to the list of content 614, as depicted in FIG. 6D, and pre-delivered to the user device X.

Example Interactions Between User Device and Network Edge Cache

The following scenarios depict various example interactions between a user device and a network edge in order to pre-deliver content from the network edge cache to the user device:

Example 1 depicts the recording of usage of a network edge cache. The cache client 116a of the user device 110a registers with the network edge cache controller 127a of the network edge cache 125a. The application 112a of the user device 110a sends a content request over the network 130. The cache client 116a checks the local cache 114a for the requested content, and delivers the content to the application 112a when the content is stored in the local cache 114a. When the content is not stored in the local cache 114a, the content request is relayed to the network edge cache controller 127a. The network edge cache controller obtains the requested content from the content provider 120a, and caches the content at the network edge cache 125a, recording the ID of the user device 110a along with information identifying the requested content in a client list at the network edge cache 125a. The network edge cache delivers the request content to the user device 110a, recording the viewing or consumption status of the content (e.g., viewing was or was not completed) in the client list.

Example 2 depicts the pre-delivery of content based on an anticipated use by a user device. The network edge cache controller 127a periodically broadcasts or syndicates obfuscated client IDs and related content requests for all user devices sharing a network edge cache 125a. The cache client 116a of the user device 110a (which includes components of the pre-delivery system 140) examines the broadcasted client list, and determines other user devices that have viewed similar content. The cache client 116 generates or updates a list of content shared by the other user devices but not yet received by the user device 110a. The cache client 116a sends a request for the list of content to the network edge cache controller 127a, and the network edge cache controller pre-delivers (e.g., delivers the content to the local cache 114a) the content for viewing or consumption at the user device 110a.

Thus, in some embodiments, the pre-delivery system 140 may group a specific user device with other user devices that have received content from a common or shared network edge cache, determine differences between the content the specific user device has received from the cache and the content the other user devices have received from the cache, and pre-deliver the content to the specific user device that has been received by the other user devices but not yet received by the specific user device.

Although aspects of the present technology have been described with respect to specific examples, embodiments of the present technology are not limited by these examples. For example, persons of skill in the art will recognize that pre-delivering content to user devices may be performed according to various other algorithms and processes without departing from the scope or spirit of the present technology.

What is claimed is:

1. A method, comprising:
   assigning a user device to a group of user devices that receive content from a common network edge cache;
   receiving, by the user device, a client list from the common network edge cache, the client list including client ID credentials associated with the group of user devices and identification information for first content related to the client ID credentials, the first content being previously delivered to the group of user devices via the common network edge cache;
   identifying, by the user device, one or more differences between the first content and second content using the client list, the second content being previously delivered to the user device via the common network edge cache;
   selecting, by a cache client of the user device, a piece of the first content to deliver to the user device based on the identified one or more differences, the selected piece of first content being delivered to a threshold number of user devices within the group of user devices, the threshold number being greater than one; and
   causing the common network edge cache to deliver the selected piece of first content to the user device,
   wherein the client ID credentials include obfuscated IDs of the group of user devices.

2. The method of claim 1, wherein causing delivery of the selected piece of first content to the user device includes causing pre-delivery of the selected piece of first content to the user device by causing the common network edge cache to deliver the selected first piece of content to a local cache of the user device before a request for the selected piece of first content has been requested by a user associated with the user device.

3. The method of claim 1, wherein assigning the user device to the group of user devices that receive content from the common network edge cache includes assigning the user device to a group of user devices that each received a similar piece of content from the common network edge cache.

4. The method of claim 1, wherein identifying the one or more differences between the second content delivered to the user device and the first content delivered to the group of user devices includes identifying one or more pieces of the first content that have been delivered to at least one device within the group of user devices but not yet been requested for delivery to the user device.

5. The method of claim 1, wherein assigning the user device to the group of user devices that receive content from the common network edge cache includes assigning the user device to the group of user devices based on a match of user demographic information associated with a user of the user device to user demographic information associated with users of the group of user devices.

6. The method of claim 1, wherein assigning the user device to the group of user devices that receive content from a common network edge cache includes assigning the user device to a group of user devices based on a match of geographic location information for the user device to geographic location information for the group of user devices.

7. The method of claim 1, wherein assigning the user device to the group of user devices that receive content from the common network edge cache includes assigning the user device to a group of user devices based on a current context associated with a user of the user device.

8. The method of claim 1, wherein assigning the user device to the group of user devices that receive content from a common network edge cache includes assigning the user device to a group of user devices having users that are friends within a social network with a user of the user device.

9. The method of claim 1, further comprising:
notifying a user of the user device when the selected piece of content has been delivered to the user device.

10. The method of claim 1,
wherein identifying one or more differences includes:
accessing a client list associated with the first content delivered by the common network edge cache to the group of user devices, the client list including information identifying user devices that have requested the first content via the common network edge cache and information identifying the requested first content; and
identifying the first content requested by the user devices that was not requested by the user device.

11. The method of claim 1, wherein identifying one or more differences between the first and second content includes:
performing deep packet inspection of data delivered from the common network edge cache to the user device and user devices within the group of user devices; and
identifying the first content requested by the user devices that was not requested by the user device.

12. The method of claim 1, further comprising:
receiving the selected piece of first content via a delivery policy that utilizes surplus network bandwidth, the surplus network bandwidth being available bandwidth defined between a current usage of a network and a total capacity of the network.

13. The method of claim 1, wherein the client list is periodically received from the common network edge cache,
wherein causing delivery of the selected piece of content to the user device includes sending a request for the selected piece of first content to a network cache controller of the network edge cache, and
wherein each of the group of user devices is a mobile device.

14. The method of claim 1, wherein the threshold number of user devices within the group of user devices is a threshold number of user devices within a current geographic area of the user device.

15. A cache client of a user device, the cache client comprising:
a device assignment module that assigns the user device to a group of user devices that receive content from a common network edge cache;
a content difference module that identifies one or more differences between first content and second content using a client list, the first content being previously delivered to the group of user devices via the common network edge cache, the second content being previously delivered to the user device via the common network edge cache, the client list including client ID credentials associated with the group of user devices and identification information for the first content related to the client ID credentials;
a content selection module that receives the client list from the common network edge cache, and that selects a piece of the first content to deliver to the user device based on the identified one or more differences, the selected piece of first content having been delivered to a threshold number of user devices within the group of user devices, the threshold number being greater than one; and
a content delivery module that causes delivery of the selected piece of first content from the common network edge cache to the user device,
wherein the client ID credentials include obfuscated IDs of the group of user devices.

16. The cache client of claim 15, wherein the content delivery module causes pre-delivery of the selected piece of first content to the user device.

17. The cache client of claim 15, wherein the device assignment module assigns the user device to a group of user devices that each received a similar piece of content from the common network edge cache.

18. The cache client of claim 15, wherein the device assignment module assigns the user device to a group of user devices based on a match of user demographic information associated with a user of the user device to user demographic information associated with users of the group of user devices.

19. The cache client of claim 15, wherein the content delivery module presents a notification to the user of the user device when the selected piece of content has been delivered to the user device.

20. A non-transitory computer-readable storage medium whose contents, when executed by a computing system, cause the computing system to perform operations to pre-deliver content to a user device from a network edge cache, the operations comprising:
assigning the user device to a group of other user devices associated with the network edge cache based on a match of content preferences for a user associated with the user device to content preferences for users associated with the other user devices;
receiving, by the user device, a client list from the common network edge cache, the client list including client ID credentials associated with the group of user devices and identification information for content related to the client ID credentials, the content being previously delivered to the group of user devices via the common network edge cache;
identifying, by a cache client of the user device, content viewed by a threshold number of user devices within the identified group of user devices but not viewed by the user device using the received client list, the threshold number of user devices being greater than one; and
receiving the identified content at a local cache of the user device from the network edge cache,
wherein the client ID credentials include obfuscated IDs of the group of user devices.

21. The non-transitory computer-readable storage medium of claim 20, wherein assigning the user device to the group of other user devices associated with the network edge cache includes assigning the user device to a group of other user devices based on matching demographic information for a user of the user device to demographic information for users of the group of other user devices.

22. The non-transitory computer-readable storage medium of claim 20, wherein the network edge cache is a group of federated network edge caches that deliver content to the user device and the group of other user devices.

* * * * *